United States Patent [19]

Ota et al.

[11] Patent Number: 5,486,338
[45] Date of Patent: Jan. 23, 1996

[54] METAL CATALYST CARRIER FOR EXHAUST GAS PURIFICATION

[75] Inventors: Hitoshi Ota; Masao Yashiro, both of Tokai; Koki Yotsuya, Kimitsu; Takuzo Kako, Kimitsu; Yuzi Nakashima, Kimitsu, all of Japan

[73] Assignees: Nippon Steel Corporation, Tokyo; Toyota Jidosha Kabushiki Kaisha, Toyota, both of Japan

[21] Appl. No.: 126,943

[22] Filed: Sep. 27, 1993

[30] Foreign Application Priority Data

Sep. 29, 1992 [JP] Japan .................... 4-260389

[51] Int. Cl.⁶ .................... F01N 3/10; B01D 53/34
[52] U.S. Cl. .................... 422/179; 422/174; 422/180; 422/199; 422/221; 422/222; 60/299; 60/300; 502/439; 502/527
[58] Field of Search .................... 422/180, 174, 422/199, 179, 221, 222; 60/300, 299; 502/439, 527; 428/116

[56] References Cited

U.S. PATENT DOCUMENTS

| | | | |
|---|---|---|---|
| 4,397,817 | 8/1983 | Otani et al. | 422/179 |
| 4,795,615 | 1/1989 | Cyron et al. | 422/179 |
| 4,818,746 | 4/1989 | Cyron | 502/527 |
| 4,832,998 | 5/1989 | Cyron | 428/116 |
| 4,923,109 | 5/1990 | Cyron | 422/180 |
| 4,928,485 | 5/1990 | Whittenberger | 422/180 |
| 4,948,774 | 8/1990 | Usui et al. | 502/439 |
| 4,985,212 | 1/1991 | Kawakami et al. | 422/179 |
| 5,079,210 | 1/1992 | Kaji et al. | 502/439 |
| 5,174,968 | 12/1992 | Whittenberger | 422/174 |
| 5,194,968 | 3/1993 | Abe et al. | 422/174 |
| 5,272,875 | 12/1993 | Kaye | 422/179 |

FOREIGN PATENT DOCUMENTS

| | | |
|---|---|---|
| 2051624 | 1/1981 | European Pat. Off. . |
| 62-83044 | 4/1987 | European Pat. Off. . |
| 0490222 | 6/1992 | European Pat. Off. . |
| 2422110 | 11/1975 | Germany . |
| 3926072 | 2/1991 | Germany . |
| 3930680 | 3/1991 | Germany . |
| 9207908 | 3/1992 | Germany . |
| 62-45345 | 2/1987 | Japan . |
| 62-273051 | 11/1987 | Japan . |
| 62-273050 | 11/1987 | Japan . |
| 62-194436 | 12/1987 | Japan . |
| 245736 | 8/1989 | Japan . |

OTHER PUBLICATIONS

Patent Abstracts of Japan, vol. 1.5, No. 73 (M–1084) 20 Feb. 1991 & JP–A–02 298 620 (Nippon Steel) 11 Dec. 1990, *abstract; FIGS. 1–5*.

Primary Examiner—Robert J. Warden
Assistant Examiner—Hien Tran
Attorney, Agent, or Firm—Kenyon & Kenyon

[57] ABSTRACT

A metal catalyst carrier for exhaust gas purification, comprising: a columnar metal honeycomb composed by spirally winding a laminate of a flat metal foil and a corrugated metal foil; a columnar metal case enclosing the metal honeycomb with a space remaining therebetween; and a cushion member disposed in the space and joined to the metal honeycomb and to the metal case alternately with respect to the column circumferential direction.

11 Claims, 4 Drawing Sheets

(ARROW: ELECTRIC CURRENT)

METAL CATALYST CARRIER FOR EXHAUST GAS PURIFICATION

BACKGROUND OF THE INVENTION

1. Field of the Invention

The present invention relates to a metal catalyst carrier for carrying a catalyst for purifying exhaust gases from automobiles or the like.

2. Description of the Related Art

Attention is drawn to a metal catalyst carrier for carrying a catalyst for purifying an automobile exhaust gas, that is produced by laminating and spirally winding together a flat foil of a heat-resisting stainless steel and a corrugated foil formed therefrom, joining the flat and corrugated foils at suitable contact portions thereof to form a honeycomb, inserting the honeycomb in a heat-resisting steel case, and joining the former to the latter.

It is important for a metal catalyst carrier to be resistive to the heat and oxidation because of hot exhaust gas and to the thermal stress and thermal fatigue because of repeated heating and cooling and temperature fluctuation over the honeycomb.

A solution to the problem of thermal stress and thermal fatigue because of repeated heating and cooling was disclosed in Japanese Unexamined Patent Publication (Kokai) Nos. 62-273050 and 62-273051, in both of which only the edges of the foils are joined to the case along the axial direction and the flat and corrugated foils of the honeycomb are not joined together.

Another solution was disclosed in Japanese Unexamined Patent Publication (Kokai) No. 62-83044, in which the flat foil has a wavy deformation with a large interval and the corrugated foil has additional corrugations with a small interval so that cells formed at the contact points between these flat and corrugated foils are allowed to deform to a greater extent, thereby mitigating the thermal stress.

The first solution, however, has a problem in that the flat and corrugated foils of the honeycomb are occasionally mutually displaced by a hot, rapid flow of exhaust gas, because these foils are joined to the case only in the edge portions.

The second solution has also problems in that it is difficult to impart a wavy deformation to a flat foil at a large interval, that a wavy-deformed foil is difficult to coil, and that the contact portions between the wavy-deformed and corrugated foils are difficult to stably join, causing an incomplete joining of each cell and failing to provide a stable structure of a honeycomb.

Japanese Unexamined Patent Publication (Kokai) No. 62-160728 disclosed a mechanical clamp of a honeycomb. This proposal, however, has a problem that the clamped honeycomb is separate from, or not joined to, a case and vibrates in the case to cause the carried catalyst to fall away, thereby reducing the purification ability.

It was also proposed to decrease thermal stress by improving a method of soldering flat and corrugated foils of a honeycomb. The improved method solders the flat and corrugated foils in selected portions of the honeycomb, i.e., the soldered portions have a vertical section either in a gate form when the foils are soldered in the upper end and in the several outermost layers of a honeycomb (herein referred to as "gate structure"), or in a symmetrical form when the foils are soldered in both ends of a honeycomb ("symmetrical structure").

Japanese Unexamined Patent Publication (Kokai) No. 62-45345 disclosed a honeycomb in which soldering is effected in a portion of a front face of the honeycomb in a regular or irregular pattern. This has an advantage that the solder material, which is generally expensive, can be saved by decreasing joints.

These proposals, particularly when applied to a recently proposed, short honeycomb, have also problems in that the "gate structure" causes a depression-type deformation to occur due to lack of stiffness in the middle portion of the honeycomb and that the "symmetrical structure" involves a poor stiffness of the honeycomb as a whole, and also, makes it difficult to provide a flexible structure composed of the honeycomb and the case with an optimum size relationship therebetween. The last proposal by Japanese Unexamined Patent Publication (Kokai) No. 62-45345 raises similar problems including a lack of the stiffness in the axial direction.

Japanese Unexamined Utility Model Publication (Kokai) No. 62-194436 disclosed that a honeycomb, in which flat and corrugated foils are joined together in one or a plurality of cross sections of the honeycomb, is joined to a case only in one of these cross sections to mitigate thermal stress in the axial direction. This structure, however, not only is difficult to apply to a short honeycomb but also has a problem in the durability under a radial thermal stress when considering a rigid structure formed at the joints between the honeycomb and the case.

As reviewed above, there are many proposals to solve the problems of thermal stress and thermal fatigue due to thermal cycle, but none of these conventional proposals is satisfactory because they unavoidably degrade the purifying ability of catalyst or raise a structural problem. The issues of thermal stress and thermal fatigue are particularly important in a short honeycomb, in which the temperature difference due to exhaust gases is greater in the radial direction than in the axial direction.

Special joined structures are difficult to apply to a short honeycomb. It is desirable that a short honeycomb has a rigid structure as a whole and the honeycomb and the case are joined by a flexible structure.

SUMMARY OF THE INVENTION

The object of the present invention is to provide a metal catalyst carrier having good durability even when a short honeycomb is used, by joining a honeycomb and a case together to form a structure which is flexible in the radial direction to mitigate thermal stress and thermal fatigue due to a thermal cycle or repeated heating and cooling.

To achieve the object according to the present invention, there is provided a metal catalyst carrier for exhaust gas purification, comprising: a columnar metal honeycomb composed by a spirally winding a laminate of a flat metal foil and a corrugated metal foil; a columnar metal case enclosing the metal honeycomb with a space remaining therebetween; and a cushion member disposed in the space and joined to the metal honeycomb and to the metal case alternately with respect to the column circumferential direction.

The cushion member can take various forms. The cushion member may be a continuous strip extending along the column circumference and joined, at a selected interval, to the metal honeycomb and to the metal case alternately with respect to the column circumferential direction.

The cushion member may have a wavy or other resilient buffer portion intermediate between the joint to the case and the joint to the honeycomb.

The cushion member may be discrete and composed of pieces arranged along the column circumference at a selected interval, each piece having ends joined to the metal honeycomb and the metal case, respectively. Each piece of the cushion member may have a wavy or other resilient buffer portion intermediate between the joint to the case and the joint to the honeycomb.

The cushion member may be continuous and composed of a plurality of sections arranged along the column circumference at a selected interval, each section having ends joined to the metal honeycomb and the metal case, respectively.

The present invention is particularly advantageous when applied to a metal catalyst carrier having a short honeycomb in which the flat foil and the corrugated foil are joined together at all portions at which these foils are in contact with each other. The short honeycomb may have a heater.

The cushion member may be also composed of separate portions discrete with respect to the column axial direction, each portions being joined to the honeycomb and to the case alternately with respect to the column circumferential direction.

The case, the cushion member and the honeycomb are generally made of a ferritic stainless steel.

Usually, the cushion member is thicker than the foil of the honeycomb and thinner than the foil of the case.

Preferably, the cushion member is provided with an anti-joining agent hereinafter discussed in portions in which the cushion member is not joined to the case or the honeycomb.

DESCRIPTION OF THE PREFERRED EMBODIMENTS

Example 1

Figure 1:
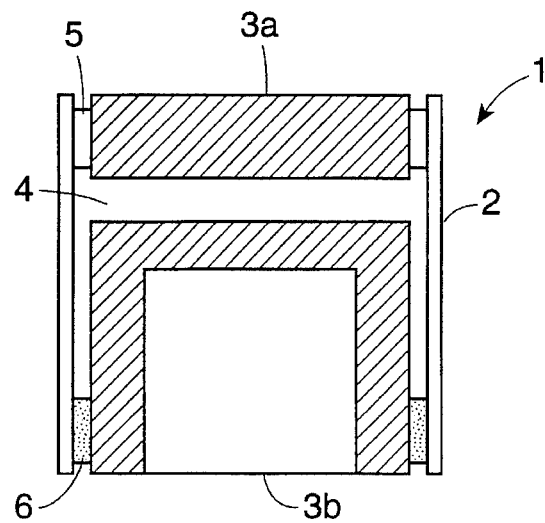
FIG. 1 shows an embodiment of the metal catalyst carrier according to the present invention, in a vertical, cross-sectional view.

FIG. 1 shows a vertical cross-section of a metal catalyst carrier according to the present invention. The shown catalyst carrier 1 has a columnar metal case 2 enclosing a columnar metal honeycomb 3 composed of separate short and long honeycombs 3a and 3b which are disposed on the upstream and downstream sides with respect to the direction of the exhaust gas flow, respectively; the short honeycomb 3a is joined to the case 2 via a cushion member 5 and the long honeycomb 3b is joined to the case 2 by a solder material 6. The long honeycomb 3b may be joined to the case 2 via a cushion member. The honeycombs 3a and 3b are composed of flat and wavy metal foils bonded together in the hatched portions by soldering, welding, diffusion bonding or other bonding method.

Figure 2:
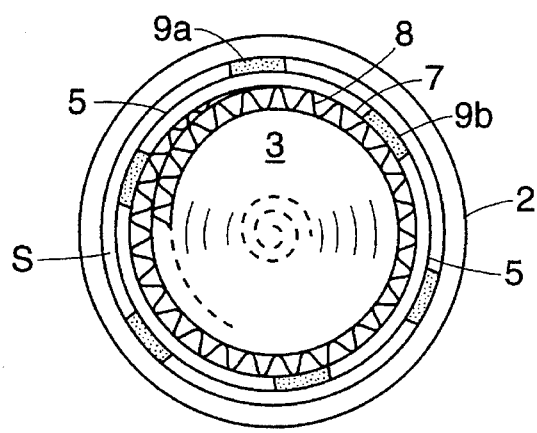
FIG. 2 shows the metal catalyst carrier shown in FIG. 1, in a top plan view.

FIG. 2 is a top plan view of the metal catalyst carrier 1 to show the joints between the case 2 and the honeycomb 3a. The case 2 encloses the honeycomb 3a composed of the flat foil 7 and the corrugated foil 8 which are joined at contact portions thereof. The cushion member 5 is disposed in a space "S" between the case and the honeycomb 3a and is continuous along the column circumference. The cushion member 5 is joined to the inner surface of the case 2 and to the outer surface of the honeycomb 3a alternately with respect to the column circumference by joints 9a and 9b arranged at a selected interval. Thus, the case 2 and the honeycomb 3a are not directly joined together but are indirectly joined via the cushion member 5, so that thermal expansion and contraction of the honeycomb 3 is not constrained by the case 2 but is absorbed by the cushion member 5 to prevent the honeycomb 3a from being damaged or broken by thermal distortion or stress.

The cushion member 5 is joined to the case 2 and the honeycomb 3a alternately at the joints 9a or 9b, in order to provide a free space between the joints to make the cushion member 5 more effective.

It is not desirable that the case 2 and the honeycomb 3a are joined to the cushion member 5 at the same position on both sides of the cushion member 5, because the thus-joined case 2, cushion 5 and honeycomb 3 form a rigid structure.

The joints 9 are preferably spaced at least at a distance two times the thickness of the cushion member 5, in order to ensure a cushion effect. Although overdrawn in FIG. 2, the case 2 and the honeycomb 3 should be spaced at a distance of not more than the thickness of the cushion member 5, because it is difficult to join the case 2 and the honeycomb 3 to the cushion 5 if the distance is greater than the thickness or wave height of the cushion member 5.

Example 2

Figure 3:
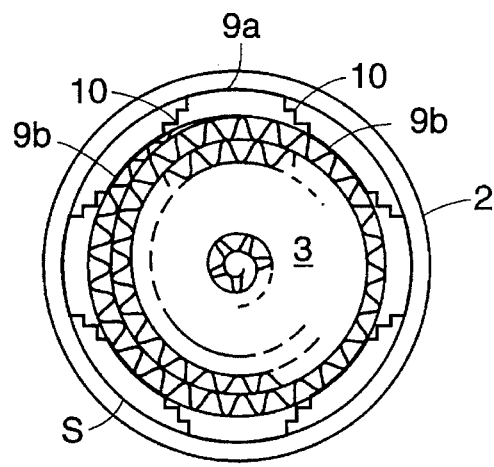
FIG. 3 shows another embodiment of the metal catalyst carrier according to the present invention, in a top plan view.
Figure 4:
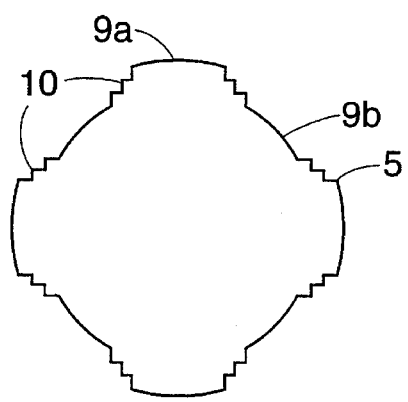
FIG. 4 shows the cushion member of the catalyst carrier shown in FIG. 3, in a plan view.

FIG. 3 shows, in a top plan view, a modification of the catalyst carrier shown in FIG. 2. FIG. 4 shows the cushion member 5 of the catalyst carrier shown in FIG. 3. The cushion member 5, disposed in the space "S" between the case 2 and the honeycomb 3, has corrugated or other resilient absorber portions 10 at the joints 9a to the case 2 and the joints 9b to the honeycomb 3, and between the joints 9a and the joints 9b, in order to promote stress absorption between the case 2 and the honeycomb 3.

Example 3

Figure 5:
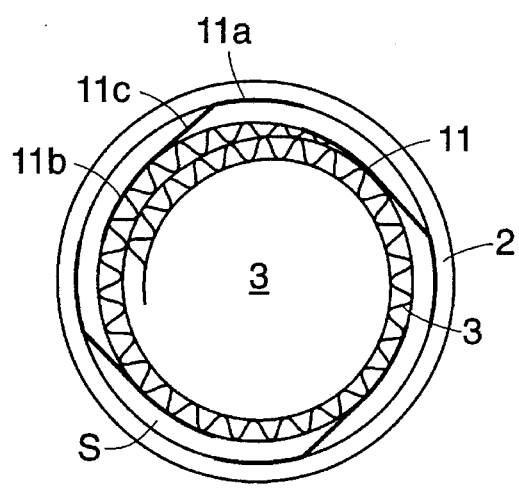
FIG. 5 shows another embodiment of the metal catalyst carrier according to the present invention, in a top plan view.
Figure 9:
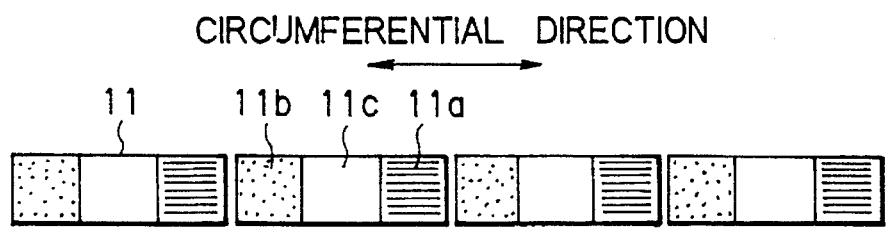
FIG. 9 shows an embodiment of the cushion member of the catalyst carrier shown in FIG. 5, in a development elevation.

FIG. 5 shows, in a top plan view, an embodiment of the present invention, in which a cushion member 5 composed of discrete cushion pieces 11 is provided in the space "S" between the case 2 and the honeycomb 3. As shown in FIG. 9 in a development elevation, the cushion pieces 11 each has three portions including an end portion 11a providing a joint to the inner surface of the case 2, another end portion 11b providing a joint to the outer surface of the honeycomb 3, and an intermediate portion 11c acting as an actual cushion.

Figure 10:
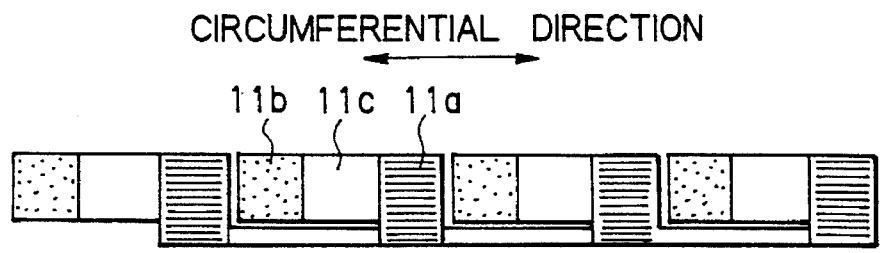
FIG. 10 shows another embodiment of the cushion member of the catalyst carrier shown in FIG. 5.

FIG. 10 shows a cushion member 5 composed of a plurality of cushion sections 11 which are formed continuous by press-forming or slit-cutting, in order to facilitate assembly or fabrication of the case 2 and the honeycomb 3.

Figure 6:
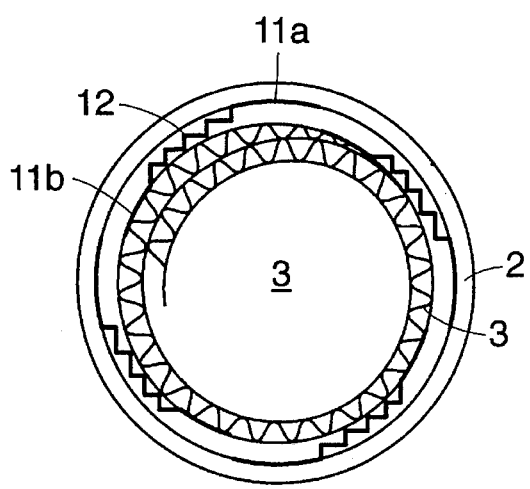
FIG. 6 shows the fourth embodiment of the metal catalyst carrier according to the present invention, in a top plan view.

Referring to FIG. 6, the intermediate portion 11b of the cushion pieces or sections 11 may be a corrugated or other resilient absorber portion 12 such as shown in FIG. 3, to improve the buffer effect.

According to the present invention, the material of the cushion member 5 is not limited so long as it is a heat-resisting steel similar to that of the case 2 or the honeycomb 3.

Preferably the cushion member 5 is a little thicker than the foil of the honeycomb 3 and a little thinner than the steel sheet forming the the case 2, and usually, has a thickness of from about 0.1 mm to about 1.0 mm.

The case 2 and the honeycomb 3 may be joined to the cushion member 5 by any suitable joining method such as soldering, welding, or diffusion bonding.

Preferably, an anti-joining agent such as $TiO_2$, $Cr_2O_3$ or other oxides, or SiC or other ceramics, are applied on the cushion member 5 in the intermediate unjoined portion between the joints to the case 2 and the honeycomb 3 to prevent undesired joining of the intermediate portion of the cushion member 5, and thereby, to ensure the cushioning effect.

Figure 7:
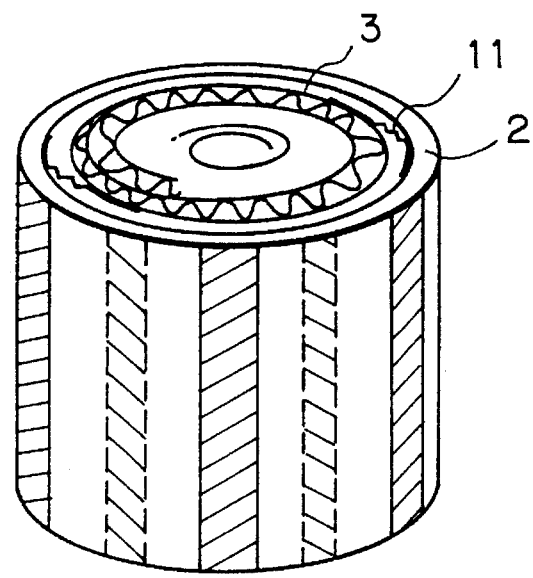
FIG. 7 shows another embodiment of the metal catalyst carrier according to the present invention, in a perspective view.
Figure 8:
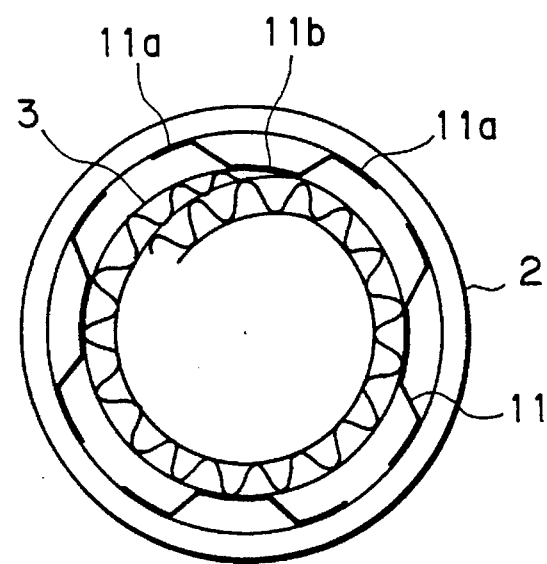
FIG. 8 shows another embodiment of the metal catalyst carrier according to the present invention, in a top plan view.

The above-mentioned cushion member 5 is particularly advantageous when used in a short honeycomb, because the latter has generally a structure in which flat and corrugated foils are joined together at all of the contact portions therebetween, and therefore, exhibits a relatively great thermal expansion and contraction in the radial direction. The cushion member 5 according to the present invention, however, is not limited to the use in a short honeycomb but may be used in a long honeycomb in which flat and corrugated foils are not necessarily joined together at all of the contact portions therebetween. FIG. 7 shows a catalyst carrier 1 in which a long honeycomb is used and a cushion member composed of cushion pieces or sections 11 are provided over the entire axial length. FIG. 8 shows another embodiment of a cushion member.

The present invention will be described further in details by way of some specific examples below.

Example 4

50 μm thick, flat and corrugated foils, both of a stainless steel, were laminated and spirally wound together to form a short honeycomb (20 mm long) and a long honeycomb (70 mm long), which are then inserted in a case 2 made of a heat resisting steel and having a wall thickness of 1.5 mm, an outer diameter of 100 mm and a length of 100 mm. The short and long honeycombs were spaced in the axial direction at a distance "4" of 10 mm, as shown in FIG. 1.

A 0.3 mm thick stainless steel cushion member 9, disposed in the space "S" between the case 2 and the honeycomb 3 (FIG. 3), has 30 mm long joint portions 9a and 9b and 8 mm long absorber portions 10; the joint portions 9a and 9b were soldered to the case 2 and the honeycomb 3, respectively. The long honeycomb 3b was soldered to the case 2 in the portion as shown in FIG. 1 and the short honeycomb 3a was entirely soldered to the case 2.

The thus-produced catalyst carrier was mounted on an automobile engine having a displacement of 2000 cc, immediately below an exhaust manifold. No damage of the honeycomb was observed in a 1000 cycle thermal cycle test in a temperature range of from 100° to 900° C.

Example 5

50 μm thick flat and corrugated foils, both of a stainless steel, were laminated and spirally wound together to form a short honeycomb (20 mm long) and a long honeycomb (90 mm), which are then inserted in a case 2 made of a heat resisting steel and having a wall thickness of 1.5 mm, an outer diameter of 90 mm and a length of 120 mm. The short and long honeycombs were spaced in the axial direction at a distance "4" of 10 mm, as shown in FIG. 1.

A 0.3 mm thick stainless steel cushion member 9, disposed in the space "S" between the case 2 and the honeycomb 3 (FIG. 8), has 20 mm long joint portions 11a and 11b and 25 mm long absorber portions 10; the joint portions 11a and 11b were soldered to the case 2 and the honeycomb 3, respectively.

The thus-produced catalyst carrier was mounted on an automobile engine having a displacement of 2000 cc, immediately below an exhaust manifold. No damage, but a small gap of about 0.5 mm between the case and the cushion 11b of the honeycomb, was observed in a 1000 cycle thermal cycle test in a temperature range of from 100° to 900° C.

Example 6

Figure 11:
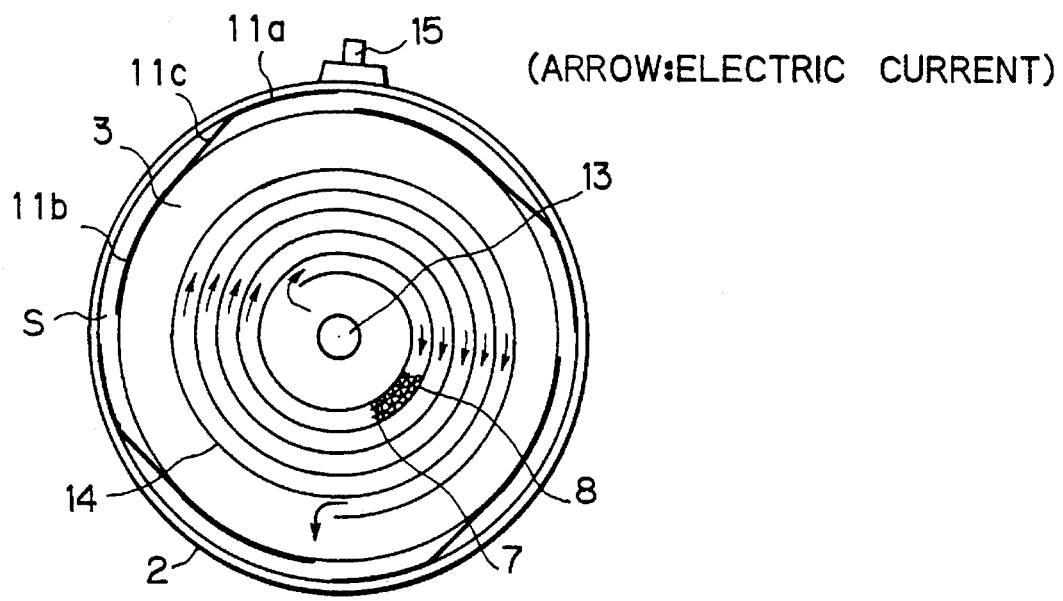
FIG. 11 shows a further embodiment of the metal catalyst carrier having a heater, according to the present invention, in a top plan view.

FIG. 11 shows an electric heating type, metal catalyst carrier according to the present invention. A center electrode 13 in the form of a rod is made from a metal bar and acts as a positive electrode. 50 μm thick flat and corrugated foils 7 and 8, both of a stainless steel, are laminated together and the tips of the foils 7 and 8 are joined to the center electrode 13. The laminate of the flat and corrugated foils 7 and 8 has only one portion in which two layers of the flat foil 7 are duplicated and an electric insulating layer 14 is interposed between these two layers. In this example, the tip of the insulating layer 14 is joined to the flat foil 7 at a position distant from the center electrode 13, the insulating layer 14 is shorter than the flat and corrugated foils 7 and 8, and the flat foil 7, the corrugated foil 8 and the insulating layer 14 are spirally wound together about the center electrode 13, to form a short honeycomb (20 mm long) with a cross section shown in FIG. 11, which is then inserted in a heat resisting steel case 2 having a wall thickness of 1.5 mm and an outer diameter of 90 mm.

A 0.6 mm thick stainless steel cushion member, disposed in the space "S" between the case 2 and the honeycomb 3, has 20 mm long joint portions 11a and 11b and 25 mm long intermediate unjoined portions 11c; the joint portions 11a and 11b soldered to the case 2 and the honeycomb 3, respectively.

The thus-produced catalyst carrier was mounted on an automobile engine having a displacement of 2000 cc, immediately below an exhaust manifold. No damage, but a small gap of about 0.5 mm between the case and the cushion 11b of the honeycomb, was observed in a 1000 cycle thermal cycle test in a temperature range of from 100° to 900° C.

The thermal cycle-tested catalyst carrier was subjected to a current path test, which showed that, when an electric current flowed from the positive center electrode 13 to a negative electrode 15, layers partitioned with the insulating layer 14 in the honeycomb normally generated heat in a short time and no substantial change was observed after the thermal cycle test.

As described hereinabove, the present invention joins a case and a honeycomb via a cushion member to absorb the thermal expansion and contraction of the honeycomb in the radial direction, thereby eliminating the conventional problems due to exfoliation and breakage of the honeycomb. The present invention is particularly advantageous when applied to a short honeycomb with or without a heater, in which the above problems are easy to occur, in order to obtain a durable metal catalyst carrier.

We claim:

1. A metal catalyst carrier for exhaust gas purification, comprising:

a columnar metal honeycomb having an inlet end and an outlet end and having a circumferential direction, said honeycomb fabricated by spirally winding a laminate of a flat metal foil and a corrugated metal foil, said columnar metal honeycomb having an axial length of 20 mm or less and having an outer circumferential surface;

a columnar metal case having an inner circumferential surface, and enclosing said columnar metal honeycomb, said inner circumferential surface of said columnar metal case being spaced from said outer circumferential surface of said columnar metal honeycomb thereby forming a circumferential space therebetween;

a cushion member disposed in said circumferential space, said cushion member having alternate joints to said inner circumferential surface of said columnar metal case and said outer circumferential surface of said columnar metal honeycomb at spaced intervals only in the circumferential direction wherein the alternate joints to at least one of said inner circumferential surface of said columnar metal case and said outer circumferential surface of said columnar metal honeycomb axially extend from said inlet end to said outlet end of said honeycomb.

2. A metal catalyst carrier for exhaust gas purification according to claim 1, wherein said case, said cushion member and said honeycomb are made of a ferritic stainless steel.

3. A metal catalyst carrier for exhaust gas purification according to claim 1, wherein said cushion member is provided with an anti-joining agent in portions in which said cushion member is not joined to said case or said honeycomb.

4. A metal catalyst carrier for exhaust gas purification according to claim 1, wherein said cushion member is a continuous strip extending in said circumferential space.

5. A metal catalyst carrier for exhaust gas purification according to claim 4, wherein said cushion member has a wavy, resilient portion intermediate said alternate joints to said inner circumferential surface of said columnar metal case and said outer circumferential surface of said columnar metal honeycomb.

6. A metal catalyst carrier for exhaust gas purification according to claim 1, wherein said cushion member is composed of discrete pieces arranged in said circumferential space in the circumferential direction at a selected interval, each discrete piece having one end and another end with respect to the circumferential direction, with the one end of each of said discrete pieces joined to said inner circumferential surface of said columnar metal case and the another end of each of said discrete pieces joined to said outer circumferential surface of said columnar metal honeycomb.

7. A metal catalyst carrier for exhaust gas purification according to claim 6, further comprising a wavy, resilient member disposed intermediate said one end and said another end of each discrete piece.

8. A metal catalyst carrier for exhaust gas purification according to claim 1 wherein said cushion member is a single member composed of a plurality of sections arrange in said circumferential space at a selected interval, each section having one end and another end with respect to the circumferential direction, with the one end of each of said sections joined to said inner circumferential surface of said columnar metal case and the another end of each of said sections joined to said outer circumferential surface of said columnar metal honeycomb.

9. A metal catalyst carrier for exhaust gas purification according to claim 1, wherein said columnar metal honeycomb has a center electrode located at the center of the honeycomb and an outer electrode external the columnar metal case located at the outer periphery of the columnar metal case for electrically heating said columnar metal honeycomb.

10. A metal catalyst carrier for exhaust gas purification according to claim 1, wherein said cushion member has a thickness and the corrugated foil and flat foil of said laminate each have a thickness, with the thickness of the cushion member being greater than the thickness of the corrugated foil, and with the thickness of the cushion member being greater than the thickness of the flat foil, and further wherein said columnar metal case is formed from a metal sheet having a thickness and wherein the thickness of said cushion member is less than the thickness of said metal sheet.

11. A metal catalyst carrier for exhaust gas purification according to claim 1, wherein the alternate joints to both said inner circumferential surface of said columnar metal case and said outer circumferential surface of said columnar metal honeycomb axially extend from said inlet end to said outlet end of said honeycomb.

* * * * *

UNITED STATES PATENT AND TRADEMARK OFFICE
CERTIFICATE OF CORRECTION

PATENT NO. : 5,486,338
DATED      : January 23, 1996
INVENTOR(S): Hitoshi OTA, et al.

It is certified that error appears in the above-indentified patent and that said Letters Patent is hereby corrected as shown below:

Column 2, line 53, delete "a" before "spirally".

Column 3, line 20, change "portions" to --portion--.

Column 4, line 42, change "overdrawn" to --exaggerated--.

Column 7, line 8, change "are easy to occur" to --can easily occur--.

Column 8, line 19, change "arrange" to --arranged--.

Signed and Sealed this

Third Day of September, 1996

Attest:

BRUCE LEHMAN

Attesting Officer

Commissioner of Patents and Trademarks